(12) United States Patent
Berman et al.

(10) Patent No.: US 9,667,530 B2
(45) Date of Patent: May 30, 2017

(54) PRIVACY PRESERVING QUERY METHOD AND SYSTEM FOR USE IN FEDERATED COALITION NETWORKS

(71) Applicant: International Business Machines Corporation, Armonk, NY (US)

(72) Inventors: Thomas J. C. Berman, Winchester (GB); Seraphin B. Calo, Cortlandt Manor, NY (US); Lu Su, Urbana, IL (US); David R. Vyvyan, Southampton (GB); Fan Ye, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 952 days.

(21) Appl. No.: 13/887,873

(22) Filed: May 6, 2013

(65) Prior Publication Data

US 2014/0328342 A1    Nov. 6, 2014

(51) Int. Cl.
G06F 9/00 (2006.01)
H04L 12/28 (2006.01)
H04L 12/707 (2013.01)

(52) U.S. Cl.
CPC .................................. H04L 45/24 (2013.01)

(58) Field of Classification Search
CPC ...... H04L 45/24; H04W 12/02; H04W 12/08; H04W 40/02
See application file for complete search history.

(56) References Cited

U.S. PATENT DOCUMENTS

| 5,805,594 A | 9/1998 | Kotchey |
| 6,031,835 A | 2/2000 | Abrali |

(Continued)

FOREIGN PATENT DOCUMENTS

| EP | 2043327 | 4/2009 |
| EP | 2106073 | 8/2010 |

(Continued)

OTHER PUBLICATIONS

Cai et al., "Secure Network Coding," Information Theory, 2002. Proceedings. 2002 IEEE International Symposium on Lausanne, Switzerland, Jun. 30-Jul. 5, 2002.

(Continued)

*Primary Examiner* — Dede Zecher
*Assistant Examiner* — Abdullah Almamun
(74) *Attorney, Agent, or Firm* — Cahn & Samuels, LLP

(57) ABSTRACT

In at least one embodiment, a method and a system include a node potentially having information responsive to an information request distributed into, for example, a federated coalition network where the node receives at least one information request packet, conducts a search of information at the node to determine if requested information is present, when the requested information is present, then the node sends an acknowledgement to a requesting node, linear network codes the requested information into m packets where m is greater than or equal to k, which is the number of packets needed to be received by the requesting node to reconstruct the requested information, selects multiple paths between the node and the requesting node such that no third party will see more than k−1 different packets, and transmits the m packets distributed over the selected paths. In a further embodiment, the method and system include operation of the network to have the capability to provide responsive information in a protected way.

19 Claims, 19 Drawing Sheets

(56) References Cited

U.S. PATENT DOCUMENTS

| | | | |
|---|---|---|---|
| 6,128,666 | A | 10/2000 | Muller et al. |
| 6,907,005 | B1 | 6/2005 | Dahlman et al. |
| 7,243,091 | B2* | 7/2007 | Kalogeraki ....... G06F 17/30864 |
| | | | 707/758 |
| 7,680,130 | B2* | 3/2010 | Ogawa .................... H04L 67/16 |
| | | | 370/254 |
| 7,957,355 | B1 | 6/2011 | Heiferling et al. |
| 8,102,837 | B2 | 1/2012 | Deb et al. |
| 8,111,619 | B2 | 2/2012 | Liu et al. |
| 8,484,263 | B2 | 7/2013 | Rosenberg |
| 8,595,262 | B1 | 11/2013 | Hayden |
| 2002/0004843 | A1 | 1/2002 | Andersson |
| 2003/0084020 | A1 | 5/2003 | Shu |
| 2004/0088393 | A1* | 5/2004 | Bullen ................ H04L 41/0663 |
| | | | 709/223 |
| 2004/0215707 | A1 | 10/2004 | Fujita |
| 2006/0209720 | A1 | 9/2006 | Nelson |
| 2007/0050516 | A1 | 3/2007 | Bona |
| 2007/0060274 | A1* | 3/2007 | Rowe ...................... G07F 17/32 |
| | | | 463/16 |
| 2007/0121635 | A1* | 5/2007 | Zhou ................... H04J 14/0294 |
| | | | 370/392 |
| 2008/0056207 | A1 | 3/2008 | Eriksson |
| 2008/0083022 | A1* | 4/2008 | Lee ......................... H04L 63/08 |
| | | | 726/5 |
| 2008/0137857 | A1 | 6/2008 | Bellare |
| 2008/0144504 | A1 | 6/2008 | Marcondes |
| 2008/0225751 | A1 | 9/2008 | Kozat et al. |
| 2008/0232390 | A1* | 9/2008 | Nakata .................... H04L 45/00 |
| | | | 370/439 |
| 2008/0294759 | A1* | 11/2008 | Biswas ................... H04L 41/04 |
| | | | 709/222 |
| 2009/0103550 | A1 | 4/2009 | Miyata |
| 2009/0135717 | A1 | 5/2009 | Kamal et al. |
| 2009/0252121 | A1* | 10/2009 | Xia ..................... H04L 12/4633 |
| | | | 370/331 |
| 2009/0254750 | A1 | 10/2009 | Bono |
| 2009/0319519 | A1* | 12/2009 | Sakakihara ....... G06F 17/30206 |
| 2010/0189110 | A1 | 7/2010 | Kambhampati |
| 2010/0257424 | A1* | 10/2010 | Lau ..................... H04L 25/4902 |
| | | | 714/749 |
| 2010/0262717 | A1* | 10/2010 | Critchley ................ H04L 12/42 |
| | | | 709/251 |
| 2010/0299313 | A1 | 11/2010 | Orsini |
| 2011/0243324 | A1 | 10/2011 | Lima et al. |
| 2012/0066249 | A1 | 3/2012 | Hays |
| 2012/0221854 | A1 | 8/2012 | Orsini et al. |
| 2013/0107699 | A1 | 5/2013 | Miclea |
| 2013/0138893 | A1* | 5/2013 | Maeda .................... G06F 13/28 |
| | | | 711/141 |
| 2013/0195106 | A1* | 8/2013 | Calmon ............ H04B 7/15521 |
| | | | 370/389 |
| 2014/0259107 | A1 | 9/2014 | Buffington |
| 2015/0106953 | A1 | 4/2015 | Berman et al. |
| 2015/0249587 | A1 | 9/2015 | Kozat |

FOREIGN PATENT DOCUMENTS

| | | |
|---|---|---|
| EP | 2106073 B1 | 8/2010 |
| EP | 2037653 | 10/2012 |
| EP | 2037653 B1 | 10/2012 |
| JP | 2005252846 | 9/2005 |
| WO | 02062032 | 8/2002 |
| WO | 2006047694 | 5/2006 |
| WO | 2008143652 A1 | 11/2008 |

OTHER PUBLICATIONS

Lima et al., "Random Linear Network Coding: A free cipher?" Information Theory, 2007. ISIT 2007. IEEE International Symposium on, May 12, 2007.

Fragouli et al., "Network Coding: An Instant Primer," ACM SIGCOMM Computer Communication Review, vol. 36, No. 1, Jan. 2006.

Vilela et al., "Lightweight Security for Network Coding," Communications, 2008. ICC '08. IEEE International Conference.

Berman et al. "A Comparative Study on Trusted Path Discovery in Two Algorithms", pp. 1-2, IBM Watson Research, Pennsylvania State University, ACITA 2012; Sep. 18, 2012.

Gerla et al. "An efficient weak secrecy scheme for network coding data dissemination in VANET", IEEE 19th International Symposium on Personal, Indoor and Mobile Radio Communications, 2008, PIMRC 2008, pp. 1-5.

Cai et al. "Secure Network Coding" Information Theory, 2002. Proceedings. 2002 IEEE International Symposium on Lausanne, Switzerland, Jun. 30-Jul. 5, 2002.

Lima et al. "Random Linear Network Coding: A free cipher?" Information Theory, 2007, ISIT 2007. IEEE International Symposium on, May 12, 2007.

Fragouli et al. "Network Coding: An Instant Primer," ACM SIGCOMM Computer Communication Review, vol. 36, No. 1, Jan. 2006.

Vilela et al. "Lightweight Security for Network Coding," Communications, 2008. ICC '08. IEEE International Conference.

Capar et al. "Network Coding for Facilitating Secrecy in Large Wireless Networks," IEEE, 46th Annual Conference on Information Sciences and Systems, 2012, pp. 1-6.

U.S. Appl. No. 14/509,638, Office action Feb. 1, 2016.
U.S. Appl. No. 14/509,638, Office action Jun. 17, 2016.

* cited by examiner

Procedure: main()
Input: $\mathcal{P} = \{p_1, p_2, \ldots, p_m\}$: The set of paths collected during the path discovery phase; $m$: The number of coded packets; $k$: The minimum number of coded packets can be used to recover the data.
Output: $\mathcal{Q} = \{q_1, q_2, \ldots, q_m\}$: The set of paths to transport $m$ coded packets.

1: Set up a counter for each party, denoted as $c_j$ ($j = 1, 2, \ldots, l$) (The set of counters is denoted by $C = \{c_1, c_2, \ldots, c_l\}$.), and initialize it as $k - 1$;
2: Path-Selection($1, \mathcal{P}, C$);
3: return $\mathcal{Q}$;

FIG. 15A

Procedure: Path-Selection($i, \mathcal{P}_i, C_i$)
Input: $i$: The index of the packet to be transported by the selected path; $\mathcal{P}_i$: The set of candidate paths to transport the $i$-th coded packet; $C_i$: The set of current counters.
Output: This procedure returns 1 if the algorithm successfully finds a path for each of the packets whose index is equal to or larger than $i$. Otherwise, 0 is returned.

1: if $\mathcal{P}_i = \Phi$ then
2:    return 0;
3: end if
4: $q_i \leftarrow$ the shortest path in $\mathcal{P}_i$;
5: $C_{i+1} \leftarrow C_i$;
6: In $C_{i+1}$, decrease the counters of the parties on $q_i$ by 1;
7: $\mathcal{P}_{i+1} \leftarrow \mathcal{P}_i$;
8: Remove from $\mathcal{P}_{i+1}$ the paths on which there is at least one party whose counter becomes 0;
9: while Path-Selection($i + 1, \mathcal{P}_{i+1}, C_{i+1}$)==0 do
10:    if $\mathcal{P}_i = \Phi$ then
11:       return 0;
12:    end if
13:    Remove from $\mathcal{P}_i$ all the paths which are covered by the same set of parties as $q_i$;
14:    $q_i \leftarrow$ the shortest path in $\mathcal{P}_i$;
15:    $C_{i+1} \leftarrow C_i$;
16:    In $C_{i+1}$, decrease the counters of the parties on $q_i$ by 1;
17:    $\mathcal{P}_{i+1} \leftarrow \mathcal{P}_i$;
18:    Remove from $\mathcal{P}_{i+1}$ the paths on which there is at least one party whose counter becomes 0;
19: end while
20: return 1;

FIG. 15B

PRIVACY PRESERVING QUERY METHOD AND SYSTEM FOR USE IN FEDERATED COALITION NETWORKS

This invention was made with Government support under Contract No.: W911NF-06-3-0001 (U.S. Army). The Government has certain rights in this invention.

BACKGROUND

The present invention relates to preserving privacy in a federated coalition network when providing information in response to an information request query. In more specific embodiments, linear network coding is used to transform the information into multiple packets.

Federated coalition networks are distributed networks formed by nodes owned by different parties. Each party represents an independent entity, for example, an organization or a company, who wants to enable data sharing with other parties in order to advance a common objective. Examples of when a federated coalition network might be used include multinational military tasks, ad hoc humanitarian cooperation, and international scientific projects. A federated coalition network may include links over unreliable segments such as wireless networks.

SUMMARY OF THE INVENTION

The invention in at least one embodiment includes a method including: receiving at least one information request packet at a node from at least one neighboring node in a federated computer network, conducting a search of information at the node by the node to determine if requested information is present, when the requested information is present, then the node sends an acknowledgement to a requesting node using header information present in the information request packet to route the acknowledgement back to the requesting node, linear network codes the requested information into m packets where m is greater than or equal to k, which is the number of packets needed to be received by the requesting node to reconstruct the requested information, selects multiple paths between the node and the requesting node such that no third party to the node and the requesting node will have more than k−1 different packets pass through any one or more node controlled by that third party, and transmits the m packets distributed over the selected paths. In a further embodiment, the method when the requested information is not present further includes updating a header information of the information request packet to include identification of the node including identity of a party owning the node, and forwarding the information request to at least one other node other than the neighboring node that sent the information request packet. In a further embodiment to the above embodiments, the method further includes: checking a header of each received information request packet for a path to determine whether the node is present in the path and/or a second neighboring node other than the neighboring nodes that sent the information request packet is present in the path, when the node is present in the path, disregarding the information request packet. In a further embodiment to the above embodiments, the method further includes receiving by the node a stop packet for the information request packet, stopping by the node the sending of the information request packet, and forwarding by the node the stop packet to neighboring node other than the neighboring node that sent the stop request.

In a further embodiment to the above embodiments, the method further includes storing a path of any received information request packet in a memory of the node. In a further embodiment, the method further includes counting by the node the number of paths for the information request packets received by the node, when the number equals n, the node stopping sending of the information request packet to neighboring nodes if the information request packet is received again. In an alternative embodiment, the method further includes when n paths are collected by the node that has sent the acknowledgement, sending a ready notification to the requesting node. In a further embodiment to the other embodiments in this paragraph, the selecting multiple paths includes setting a counter for each other third party present in the federated coalition network equal to k−1, selecting a first path between the node and the requesting node based at least in part on stored paths for the information request packet, reducing the counter for each third party present along the first path by a number of packets to be sent over the first path, selecting at least one second path between the node and the requesting node based at least in part on stored paths for the information request packet, and reducing the counter for each third party present along the at least one second path by a number of packets to be sent over the at least one second path. In a further embodiment, where the first path and the at least one second path are selected based on at least length of the paths such that a shortest path is selected for the first path and a next longest path is selected for the second path. In a further embodiment to the previous two embodiments, the method further includes sending a notification from the node to the requesting node regarding being unable to send requested information if insufficient paths exist to send m packets containing the requested information. In an alternative embodiment, the selecting multiple paths includes setting by a central processor a counter for each other third party present in the federated coalition network equal to k−1, selecting by the central processor a first path between the node and the requesting node based at least in part on stored paths for the information request packet at the node, reducing by the central processor the counter for each third party present along the first path by a number of packets to be sent over the first path, selecting by the central processor at least one second path between the node and the requesting node based at least in part on stored paths for the information request packet at the node, and reducing by the central processor the counter for each third party present along the at least one second path by a number of packets to be sent over the at least one second path.

In an alternative embodiment to the prior paragraph, the selecting n paths includes retrieving paths for the federated coalition network between the node and the requesting node where the paths are based on topology for the federated coalition network derived from link state flooding messages, setting a counter for each other third party present in the federated coalition network equal to k−1, selecting a first path between the node and the requesting node based at least in part on retrieved paths, reducing the counter for each third party present along the first path by a number of packets to be sent over the first path, selecting at least one second path between the node and the requesting node based at least in part on retrieved paths, and reducing the counter for each third party present along the at least one second path by a number of packets to be sent over the at least one second path. In a further embodiment, the first path and the at least one second path are selected based on at least length of the paths such that a shortest path is selected for the first path and a next longest path is selected for the second path.

The invention in at least one embodiment includes a method including: sending an information request packet from a requesting node into a federated coalition network having a plurality of nodes owned by at least two other parties, receiving the information request packet by at least one neighboring node of the requesting node, updating a header information of the information request packet to include identification of the node that received the information request including identity of a party owning the recipient node, sending the information request packet from the node that received the information request packet to nodes in communication with it other than the requesting node, receiving at least one information request packet at a recipient node (directly or indirectly) from at least one neighboring node, conducting a search of information at the recipient node by the recipient node to determine if the requested information is present, when the requested information is present, then the recipient node sends an acknowledgement to a requesting node using header information present in the information request packet to route the acknowledgement back to the requesting node, linear network codes the requested information into m packets where m is greater than or equal to k, which is the number of packets needed to be received by the requesting node to reconstruct the requested information, selects paths between the recipient node and the requesting node such that no third party to the recipient node and the requesting node will have more than k−1 different packets pass through any one or more node controlled by that third party, and transmits the m packets distributed over the selected paths.

The invention in at least one embodiment includes a method including: sending a request for information from a requesting node into a federated coalition network having a plurality of nodes owned by at least two other parties, collecting any acknowledgement sent in response to the information request for a period of time equal to twice a network traversal time for the federated coalition network by the requesting node, sending a stop packet by the requesting node to any node neighboring the requesting node after receiving a ready packet from any node that sent the acknowledgement, receiving at least k linear network coded packets by any node that sent an acknowledgement to the requesting node such that no other party in the federated coalition network received more than k−1 different packets, and reconstructing the information from the at least k linear coded packets.

BRIEF DESCRIPTION OF DRAWINGS

The present invention is described with reference to the accompanying drawings. In the drawings, like reference numbers indicate identical or functionally similar elements.

FIGS. 15A and 15B illustrate another method for selection of paths according to at least one embodiment of the invention.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

Figure 1:
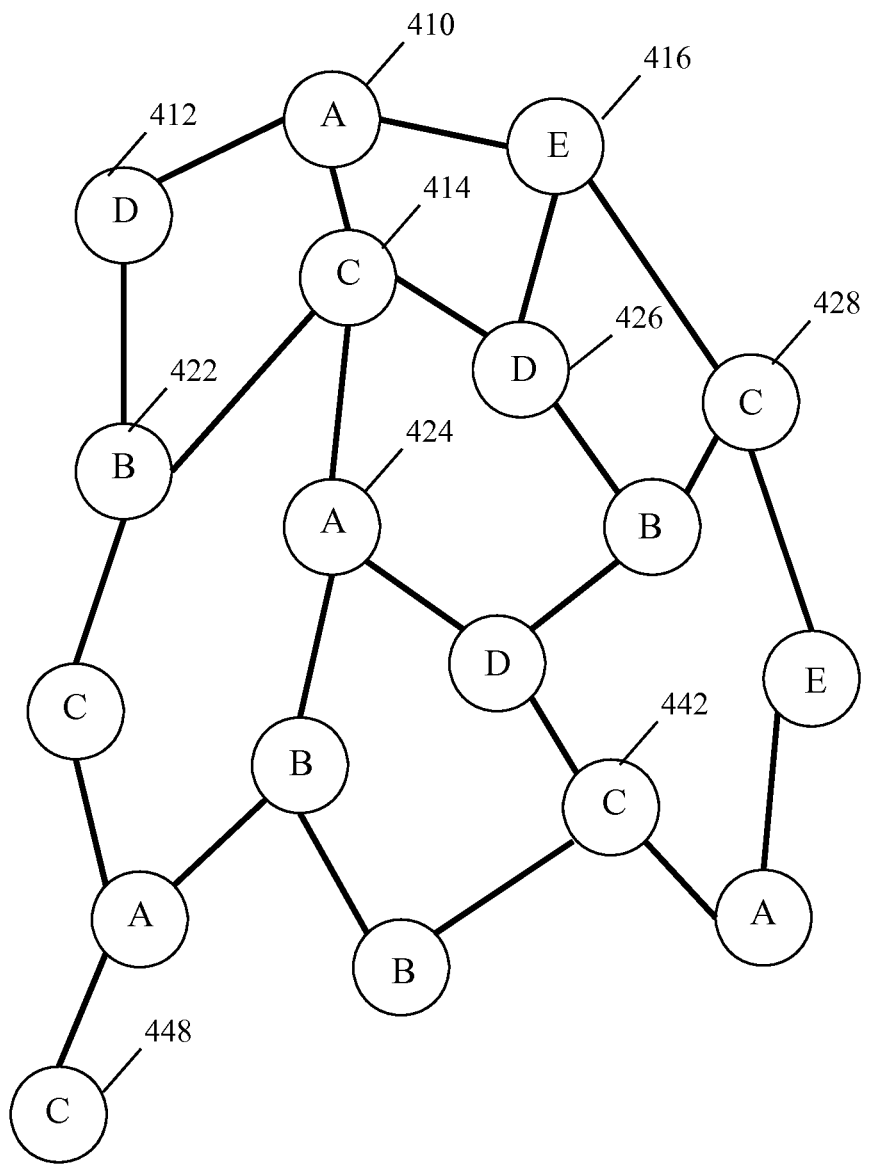
FIG. 1 illustrates an example of a federated coalition network according to at least one embodiment of the invention.

FIG. 1 illustrates an example of a federated coalition network (or a federated computer network) in which multiple parties participate in the formation of the network and own varying numbers of nodes present in the network at anyone moment. Federated coalition networks may take a variety of forms in terms of the number of nodes that are present and the interconnections between the nodes, and as such FIG. 1 is being used as an example of such a network to discuss at least one embodiment according to the invention. The illustrated network includes five (5) parties (or owners), i.e., A, B, C, D, and E. The nodes in the federated coalition network form an unstructured multi-hop overlay network where the nodes cooperate for information exchange. Each node provides a connection to data stored on at least one storage system (e.g., computer, server, network area storage, etc.) where the data may be stored, for example, as relational data. In at least one embodiment, the location of the data is unknown to the other nodes.

In at least one embodiment, each party has distinct pair-wise policies about which data might be shared with which other party. An example of this is that Party B's data shared to Party A should not be visible to Party C unless explicitly allowed by the policy. In such an embodiment, each party is honest but curious as it plays by previously agreed rules for the federated coalition network and does not intentionally intercept messages, but it will read any information that passes through a node it owns. Each node operates in accordance with policies established for the federated coalition network using, for example, a processor running software to perform network communication between the interconnected nodes and the illustrative methods discussed in this disclosure.

Figure 2:
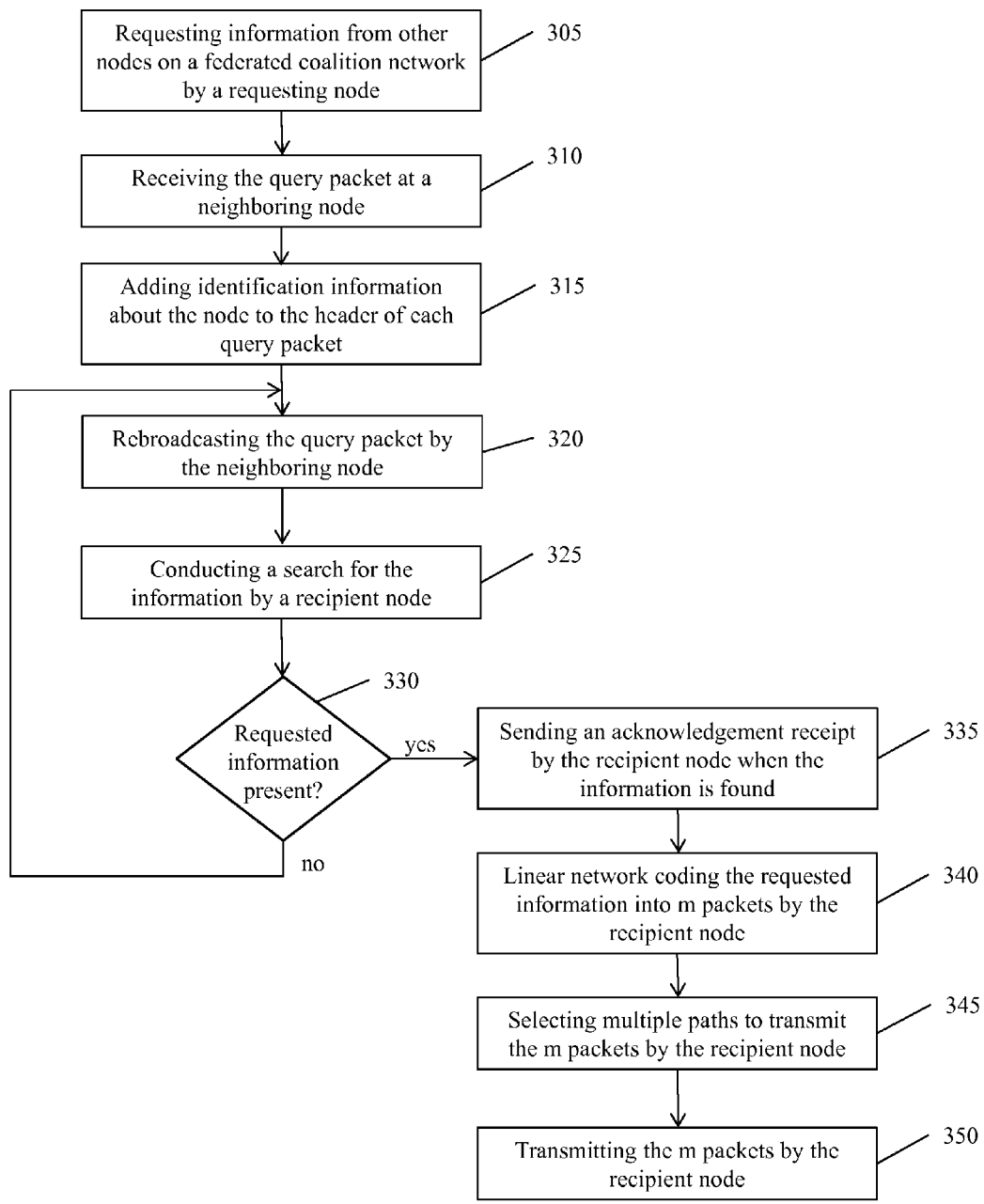
FIG. 2 illustrates a flowchart of a method for requesting information in a federated coalition network according to at least one embodiment of the invention.
Figure 3:
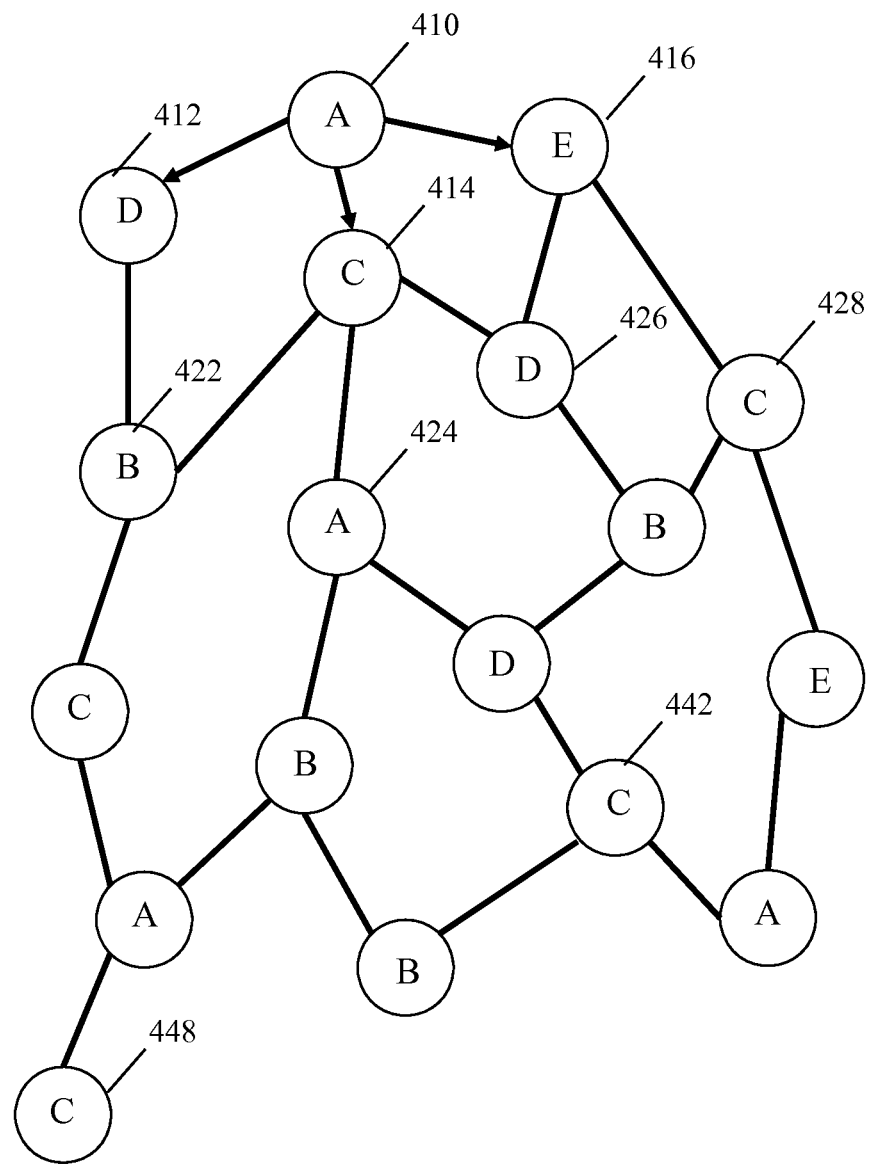
FIG. 3 illustrates the federated coalition network illustrated in FIG. 1 with annotation.

In at least one embodiment illustrated in FIG. 2, a method for maintaining privacy of information communication between two nodes that are not direct neighbors to each other is provided when there are multiple communication paths available between the nodes as illustrated in, for example, FIG. 1. A node (or requesting node) requests information that may be stored at other nodes present in the federated coalition network by sending a query (or request) for information into the federated coalition network, 305. For example, node 410 requests information and sends the information request packet to each of the neighboring nodes 412, 414, 416 as illustrated in FIG. 3. There is no limitation that would prevent another node in the illustrated federated coalition network other than node 410 to be the requesting node instead of node 410.

Figure 4:
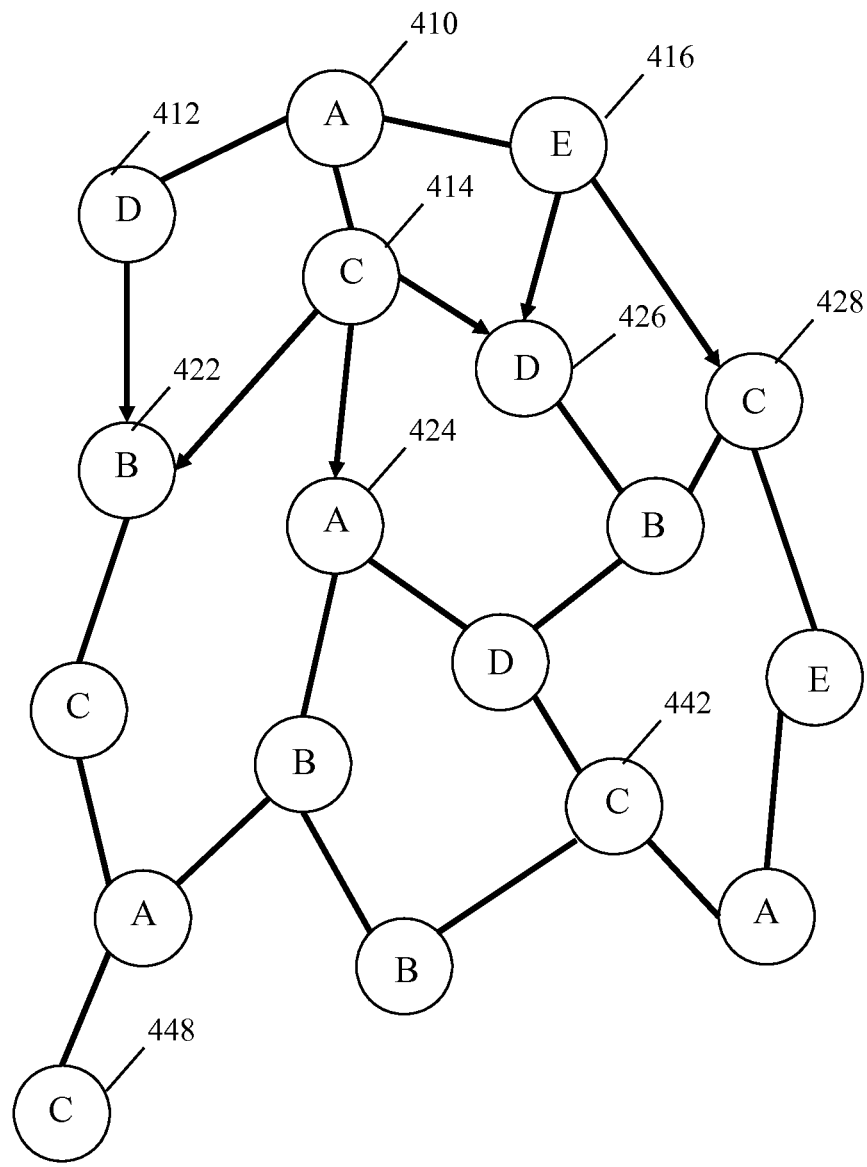
FIG. 4 illustrates the federated coalition network illustrated in FIG. 1 with annotation.

At least one neighboring node of the requesting node receives the information request packet, 310. Each of these intermediate nodes rebroadcasts the query packet to its neighbor(s) (or recipient node(s)) 422, 424, 426, 428 other than the one from which it received the query, 320, as illustrated in FIG. 4. In at least one optional embodiment, each node adds identification information about the node that received the information request to the header of each query packet, 315. In at least one further embodiment, the identification information includes at least one of the identity of the party owning the recipient node and at least one neighboring node that sent the information request, which in a further embodiment provides routing information for the path that the information request packet followed from the requesting node. The rebroadcasting continues through the network unless the receiving node determines it has the requested information or is not connected to two nodes with an example of this being node 448 owned by Party C in FIG. 4.

The recipient node conducts a search of the information at the recipient node to determine if the requested information is present at that node, 325. In at least one embodiment, the search is of a relational database stored on a storage system in communication with the recipient node.

As illustrated in FIG. 2, in at least one embodiment when the requested information is present, 330, then the recipient node provides the requested information to the requesting node, 335-350. In at least one embodiment, the check for the requested information is performed once per unique information request with the node forwarding the packet for each time it is received in the future without performing the check (unless a stop packet has been received). The recipient node sends an acknowledgement to the requesting node using the header information present in the information request packet to route the acknowledgement back to the requesting node, 335. The recipient node linear network codes the requested information into m packets where m is greater than or equal to k, which is the minimum number of packets needed to be received to reconstruct the requested information, 340. In at least one embodiment, the recipient node divides the information into k pieces that will be used to generate the m coded packets through linear network coding. The recipient node selects multiple paths between the recipient node and the requesting node such that no third party to them will have more than k−1 different packets pass through the node(s) controlled by that third party, 345. The recipient node transmits the m packets distributed over the selected paths, 350. In at least one embodiment, the number of selected paths is equal to and/or less than n, which in at least one embodiment is the minimum number of paths a recipient node needs to know for it to respond with its data. In at least one embodiment, the m paths are selected where some of the paths may completely overlap or partially overlap with at least one other selected path. The k, m, and n variables in at least one embodiment are preset (or predetermined) for the federated coalition network. In an alternative embodiment, at least one variable is set on an ad hoc basis between the recipient node and the requesting node based on the contents of the acknowledgement sent by the recipient node. An example is that the recipient node includes in the acknowledgement the value(s) of the variable(s). In a further alternative embodiment, at least one variable is predetermined for communication between two parties as part of the establishment of the federated coalition network or an existing policy.

In at least one embodiment, when the requested information is not present, the recipient node forwards the information request packet to at least one neighboring node, if present. In a further embodiment when the requested information is not present at the node, the node updates the header information of the information request packet to include at least one of the identification of the node including the identity of the party that owns the node and the at least one neighboring node that sent the information request packet to the node. The node forwards the information request packet to at least one other node other than the neighboring node that sent the information request packet being forwarded assuming there are at least two neighboring nodes.

Figure 5:
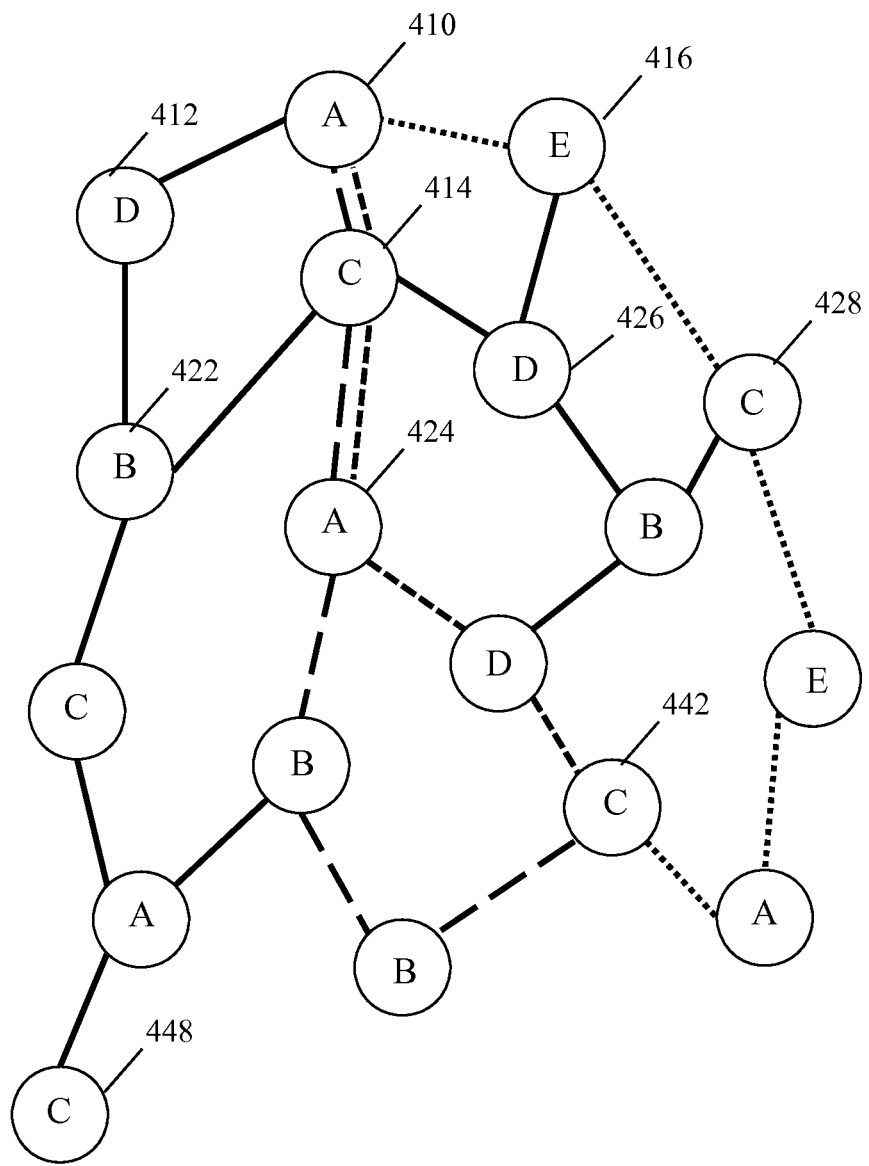
FIG. 5 illustrates the federated coalition network illustrated in FIG. 1 with annotation.

For illustration purposes and using FIG. 5, node 442 is the recipient node having information that satisfies the information request sent by requesting node 410. Node 442 is owned by Party C while node 410 is owned by Party A. There are at least three paths between the two nodes as represented by the dotted line (C-A-E-C-E-A), the short dashed line (C-D-A-C-A), and the longer dashed line (C-B-B-A-C-A) in FIG. 5. For this illustration, k will equal 2, m will equal 3 and n will equal 3. The three paths satisfy the n requirement, which in at least one embodiment is the minimum number of paths discovered by the recipient node. If each packet is sent along a different path, then Party B will see just one packet from it owning nodes along the longer dashed line path, Party D will see just one packet from it owning a node along the short dashed line path, and Party E will see just one packet from it owning nodes along the dotted line path. Thus the requirement that k−1 (i.e., 2−1=1) packet(s) at the most be seen by any one other third party in the federated coalition network is satisfied. Assuming that at least two packets make it through the federated coalition network between node 442 and node 410, then node 410 will be able to deconstruct the packets to obtain the requested information.

Figure 6:
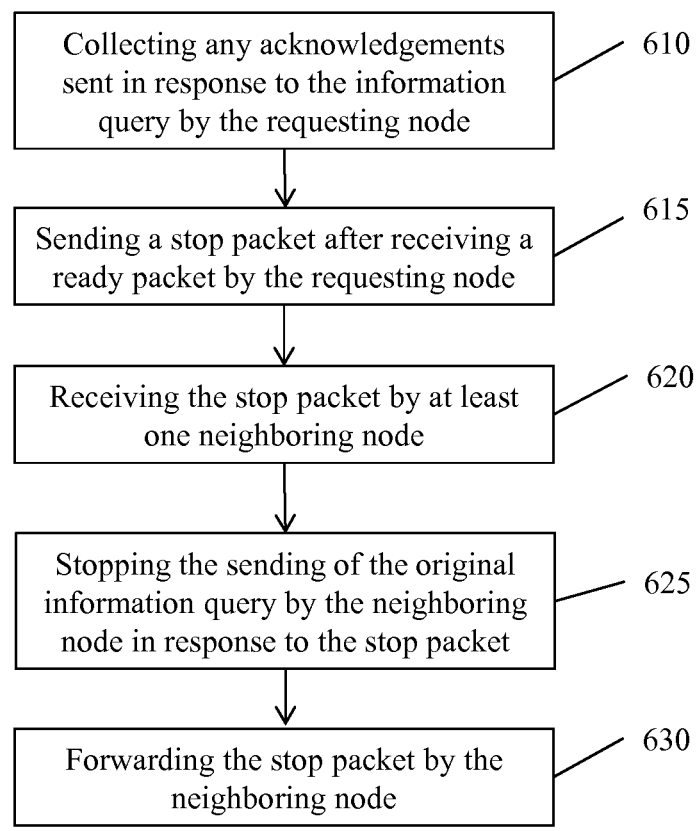
FIG. 6 illustrates a method for a requesting node to request information in a federated coalition network according to at least one embodiment of the invention.

In a further embodiment illustrated in FIG. 6, the requesting node 410 collects (or receives) any acknowledgement sent in response to the information request, 610. In at least one embodiment, the requesting node 410 collects acknowledgements for a period of time equal to twice a network traversal time for the federated coalition network, and if no acknowledgements are received, then the requesting node 410 determines the requested information is not available in the federated coalition network. After receiving a ready packet from any one or more nodes that has sent an acknowledgement, the requesting node 410 sends a stop packet to any node 412, 414, 416 that neighbors the requesting node 410, 615. The at least one neighboring node (for example, node 412) receives the stop packet for the information request, 620. The at least one neighboring node stops sending the original information request in response to receiving the stop packet, 625. The at least one neighboring node forwards the stop packet, 630, to any neighboring node other than the neighboring node that sent the stop request (for example, node 412 to node 422 or node 416 to nodes 426, 428).

In a further embodiment, each node stores all of the paths of the information request packets that it has received in a memory. The nodes check the header of each received information request packet for the path that the information request has traveled from the requesting node to the present node. In at least one embodiment, if the path contains the present node there is a loop and the present node disregards the information request packet. In at least one embodiment, if the path contains a second neighbor node other than the neighboring node that forwarded the information request packet to the present node, then that path is a useless one and the present node disregards the information request packet. In a further embodiment, if either of the conditions of the prior two embodiments are met, then the present node disregards the information request packet. When the information request packet is not disregarded, then the present node adds this path to storage and forwards the information request packet to the neighbor nodes it has not identified in the header.

In a further embodiment, the recipient node stores all the paths of the information request packets that it has received in a memory. The recipient node uses the stored path information in at least one embodiment illustrated in FIG. 7 to select paths. The recipient node sets a counter for each third party present in the federated coalition network equal to k−1, 710. The recipient node selects a first path between the recipient node and the requesting node based at least in part on the stored paths for the information request, 715. The recipient node reduces the counter for each third party present along the first path by the number of packets to be sent over the first path, 720. The recipient node selects at least one second path between the recipient node and the requesting node based at least in part on the stored paths for the information request, 725. The recipient node reduces the counter for each third party present along the at least one second path by the number of packets to be sent over the at least one second path, 730. The number of paths selected in at least one embodiment equals n, while in another embodiment the number of paths selected is less than n. In a further embodiment, the paths are selected based on at least the length of the paths such that a shortest path is selected for the first path and the next shortest path is selected for the second path at least initially. In a further embodiment to the embodiments in this paragraph, when the third party counter goes below zero, the recipient node selects a different path to replace the last selected path while in another embodiment the recipient node replaces more than the last selected path. In a further embodiment to the prior embodiment, when there are no more paths available, then the recipient node notifies the requesting node that the requested information will not be sent, the nodes will need to wait until there is a change in the available paths between the recipient node and the requesting node, and/or a different method will need to be used. In an alternative embodiment, the recipient node uses the counter for each third party in conjunction with a recursive process to select a path to send each of the m packets over to reach the requesting node.

In an alternative embodiment, the packets are assigned by the recipient node to a path until each packet is assigned a path, or if no path is available for the i-th packet, it traces back and cancels the path assignment for the (i−1)-th packet. The recipient node moves the (i−1)-th packet from an assigned set to an unassigned set, increases any counters by one and moves back any path eliminated during the previous assignment. The recipient node reassigns its path to the next shortest one, and update counters, move paths accordingly. In at least one embodiment, the recipient node repeats the selection process until a feasible solution is found or traces back further in the assigned paths. If the recipient node cannot trace back any more and/or if the algorithm does not finish within a certain predetermined time, the recipient node declares failure and in a further embodiment the recipient node notifies the requesting node that the requested information will not be sent.

Based on the above discussion, one of ordinary skill in the art should appreciate that in at least one embodiment, the operation of an individual node within the federated coalition network may be extracted from the above discussed method embodiments. The discussions that follow provide additional embodiments for operation of individual nodes within the federated coalition network.

Figure 8:
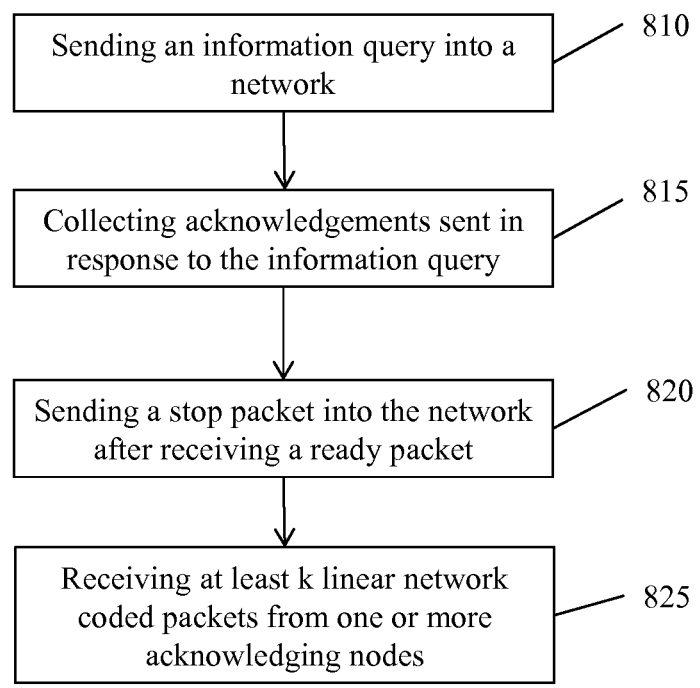
FIG. 8 illustrates a further method for a requesting node in a federated coalition network according to at least one embodiment of the invention.

In a further embodiment illustrated in FIG. 8, the method includes operation of a requesting node in terms of requesting and receiving information in a federated coalition network. The requesting node sends a request for information into a federated coalition network having a plurality of nodes owned by at least two other parties, 810. The requesting node collects any acknowledgements, which represent that another node in the federated coalition network has the requested information, that are sent in response to the information request packet for a period of time equal to twice a network traversal time for the federated coalition network, 815. In at least one embodiment, if no acknowledgements are received within the response time period, then the requesting node will know that the requested information is not available in the federated coalition network.

The requesting node sends a stop packet to any node neighboring the requesting node after receiving a ready packet from any one or more nodes that has previously sent an acknowledgement, 820. In an alternative embodiment, the requesting node waits until it receives a ready packet from every node that has sent an acknowledgement.

The requesting node receives at least k linear network coded packets from any node that sent an acknowledgement to the requesting node such that no other party in the federated coalition network receives more than k−1 different packets, 825. The requesting node reconstructs the information from the at least k linear coded packets, 830.

Figure 9:
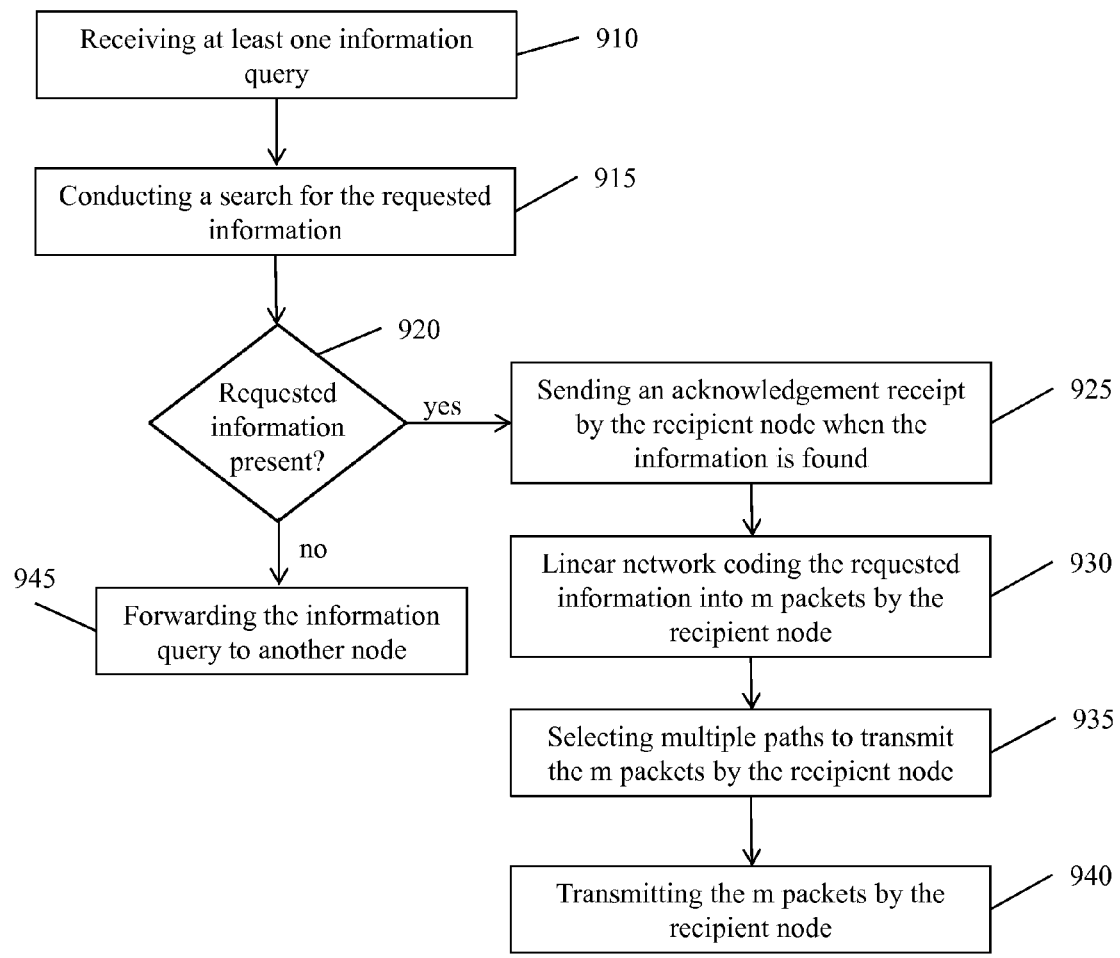
FIG. 9 illustrates a method for a recipient node receiving an information request in a federated coalition network according to at least one embodiment of the invention.

FIG. 9 illustrates an example method of operation of a node in the federated coalition network other than the requesting node. The node receives at least one information request from at least one neighboring node in the federated coalition network, 910. An example of this in FIG. 4 is node 424 receiving the information request packet from node 414.

The node conducts a search of the information at the node to determine if the requested information is present at that node, 915. In at least one embodiment, the search is of a relational database stored on a storage system in communication with the recipient node.

As illustrated in FIG. 9, in at least one embodiment when the requested information is present, 920, then the (recipient) node provides the requested information to the requesting node, 925-940. In at least one embodiment, the check for the requested information is performed once per unique information request with the node forwarding the packet for each time it is received in the future without performing the check (unless a stop packet has been received). The node sends an acknowledgement to the requesting node using the header information present in the information request packet to route the acknowledgement back to the requesting node, 925. The node linear network codes the requested information into m packets where m is greater than or equal to k, which is the minimum number of packets needed to be received to reconstruct the requested information, 930. In at least one embodiment, the node divides the information into k pieces that will be used to generate the m coded packets through linear network coding. The node selects multiple paths between the node and the requesting node such that no third party to them will have more than k−1 different packets pass through the node(s) controlled by that third party, 935. The node transmits the m packets distributed over the selected paths, 940. In at least one embodiment, the number of selected paths is equal to and/or less than n, which in at least one embodiment is the minimum number of paths a recipient node has to discover before it can respond with its data. In at least one embodiment, the m paths are selected where some of the paths may completely overlap or partially overlap with at least one other selected path. The k, m, and n variables in at least one embodiment are preset (or predetermined) for the federated coalition network. In an alternative embodiment, at least one variable is set on an ad hoc basis between the node and the requesting node based on the contents of the acknowledgement sent by the recipient node. An example is that the node includes in the acknowledgement the value(s) of the variable(s). In a further alternative embodiment, at least one variable is predetermined for communication between two parties as part of the establishment of the federated coalition network or an existing policy.

In at least one embodiment, when the requested information is not present, the recipient node forwards the information request packet to at least one neighboring node, if present, 945. In a further embodiment when the requested information is not present at the node, the node updates the header information of the information request packet to include at least one of the identification of the node including the identity of the party that owns the node and the at least one neighboring node that sent the information request packet to the node. The node forwards the information request packet to at least one other node other than the neighboring node that sent the information request packet being forwarded assuming there are at least two neighboring nodes.

In a further embodiment when a stop packet is transmitted by the requesting node, the method further includes steps to be performed by the node. The node receives a stop packet for the information request from a neighboring node. The node stops the sending of the information request packet to other nodes if the information request is received again. The node forwards the stop packet to each neighboring node other than the neighboring node that sent the stop packet to the node assuming there are at least two neighboring nodes. In an alternative embodiment, where the stop packet is received a second time, the node disregards the second or later stop packet.

In a further embodiment, the recipient node counts the number of paths for the information request received by the node, which for example may occur at substantially the same time, prior to or after the path of the received information request packet is stored in a memory of the node. In at least one embodiment, when the number of paths equals n, the node stops sending the information request packet to neighboring nodes, for example, if the information request packet is received again or does not send the information request packet that had the counter equal n. In a further embodiment, the node that has sent an acknowledgement to the requesting node and once n paths are collected by the node, the recipient node sends a ready notification to the requesting node.

Figure 7:
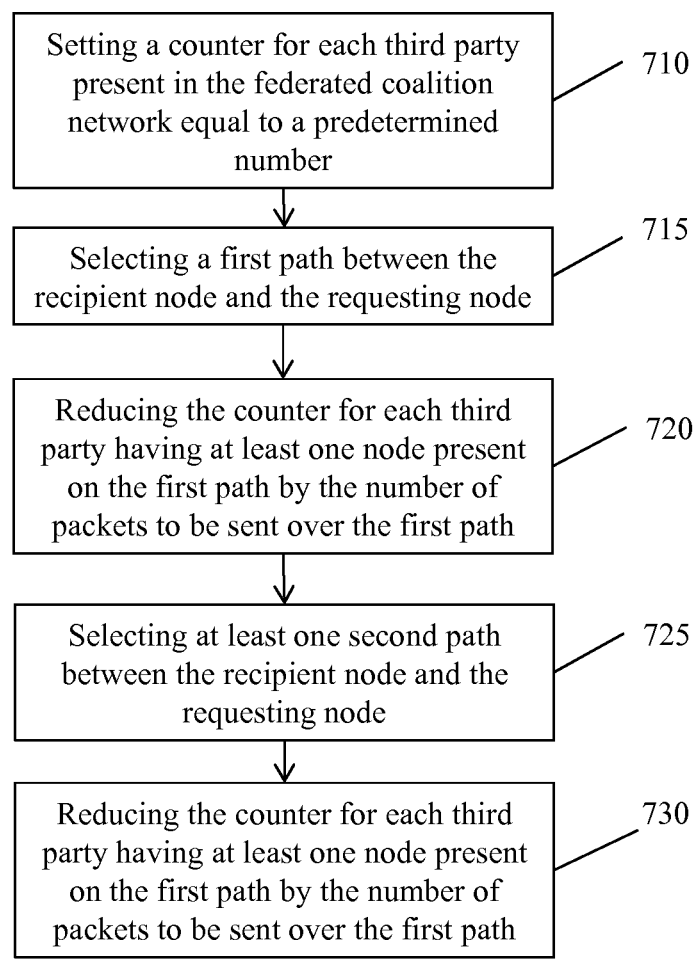
FIG. 7 illustrates a method for selection of paths according to at least one embodiment of the invention.

An example of how the recipient node may select the paths to send the m packets over to the requesting node is illustrated in FIG. 7 and discussed above. In a further embodiment to that illustrated in FIG. 7, the recipient node will send a notification to the requesting node when the recipient node is unable to send the requested information because of insufficient paths existing to send the requested information while having no third party seeing more than k−1 different packets containing the requested information.

Figure 10:
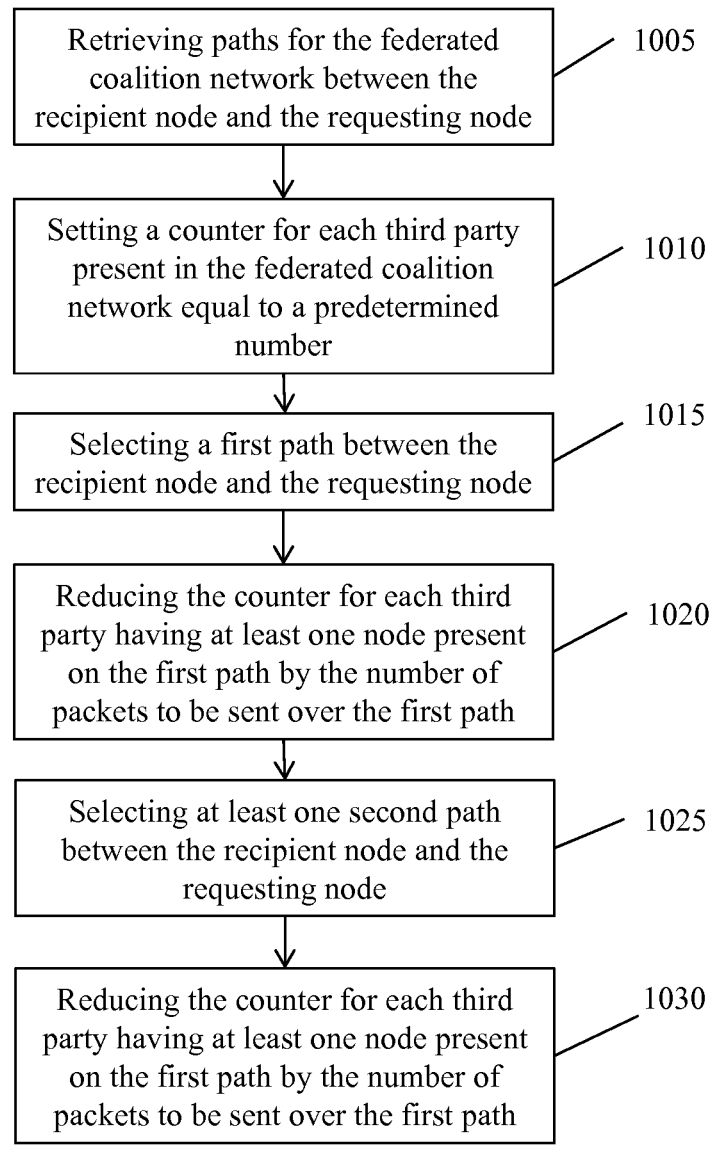
FIG. 10 illustrates an alternative method for selection of paths according to at least one embodiment of the invention.

An alternative method for selecting the paths is illustrated in FIG. 10. The recipient node retrieves paths for the federated coalition network between itself and the requesting node where the paths are based on topology for the federated coalition network derived from link state flooding messages, 1005. In at least one embodiment, the paths are stored in a central database accessible by the nodes present on the federated coalition network where the central database stores the topology of the federated coalition network. In at least one further embodiment, the central database is maintained at one of the nodes in the federated coalition network. In an alternative further embodiment, each node maintains its own path database that is stored in memory and/or a storage device connected to the node.

The node sets a counter for each other third party present in the federated coalition network equal to k−1, 1010. The node selects a first path between the node and the requesting node based at least in part on the stored paths for the information request, 1015. The node reduces the counter for each third party present along the first path by the number of packets to be sent over the first path, 1020. The node selects at least one second path between the node and the requesting node based at least in part on the stored paths for the information request, 1025. The node reduces the counter for each third party present along the at least one second path by the number of packets to be sent over the at least one second path, 1030. The number of paths selected in at least one embodiment equals n, while in another embodiment the number of paths selected is less than n. In a further embodiment, the paths are selected based on at least the length of the paths such that a shortest path is selected for the first path and the next shortest path is selected for the second path at least initially. In a further embodiment to the embodiments in this paragraph, when the third party counter goes below zero, the node selects a different path to replace the last selected path while in another embodiment the node replaces more than the last selected path. In a further embodiment to the prior embodiment, when there are no more paths available, then the nod notifies the requesting node that the requested information will not be sent, the nodes will need to wait until there is a change in the available paths between the nod and the requesting node, and/or a different method will need to be used.

In an alternative embodiment to having the recipient node in the above embodiments select the paths to be used to transmit the information packets from the recipient node to the requesting node, a central processor is used to do the selection of the paths and the number of packets to send over each path for the recipient node. In a further embodiment, the central processor is in communication with the central path database.

In an alternative embodiment to the above embodiments using a counter to limit the number of different packets passing through a node owned by a third party, the counter for a third party is eliminated if there is a policy in place between the third party and the party that owns the recipient node regarding the transfer of information through their respective nodes that would limit the third party from eavesdropping on the packets that pass through its nodes.

Examples of path selection will be provided in the following discussion in connection with FIGS. 11-14 where the rectangular boxes represent packets and the circles represent nodes. If a packet goes through a node along a path, that packet will be observed by the party who owns that node. In at least one embodiment, a path for each packet from the total n discovered paths is found such that the aggregate transmission cost of the m packets can be minimized while none of the third parties can observe more than k−1 packets.

Figure 11:
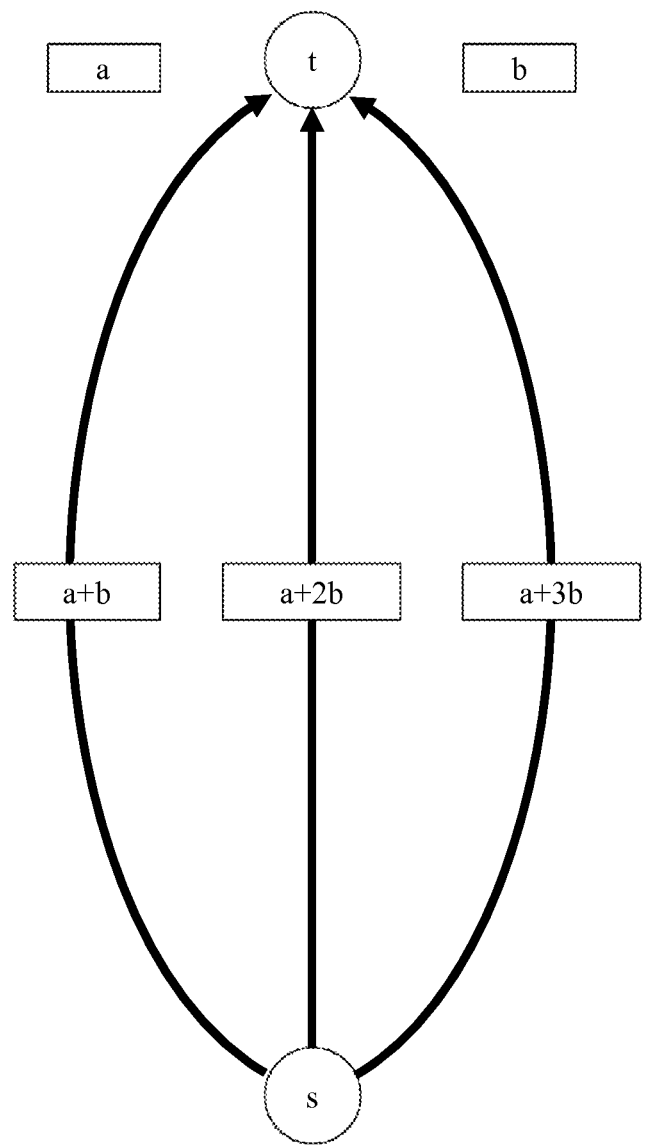
FIG. 11 illustrates an example of the use of linear coding in at least one embodiment of the invention.

FIG. 11 provides an illustration of linear network coding where the information is contained in a and b together. The source node s generates m different independent linear combinations of a and b and sends them (and coefficients) along different paths (i.e., "a+b", "a+2b", and "a+3b"). As long as destination node t collects k of the m coded packets, it can recover (or reconstruct) a and b. The m and k values can be tuned in at least one embodiment.

Figure 12:
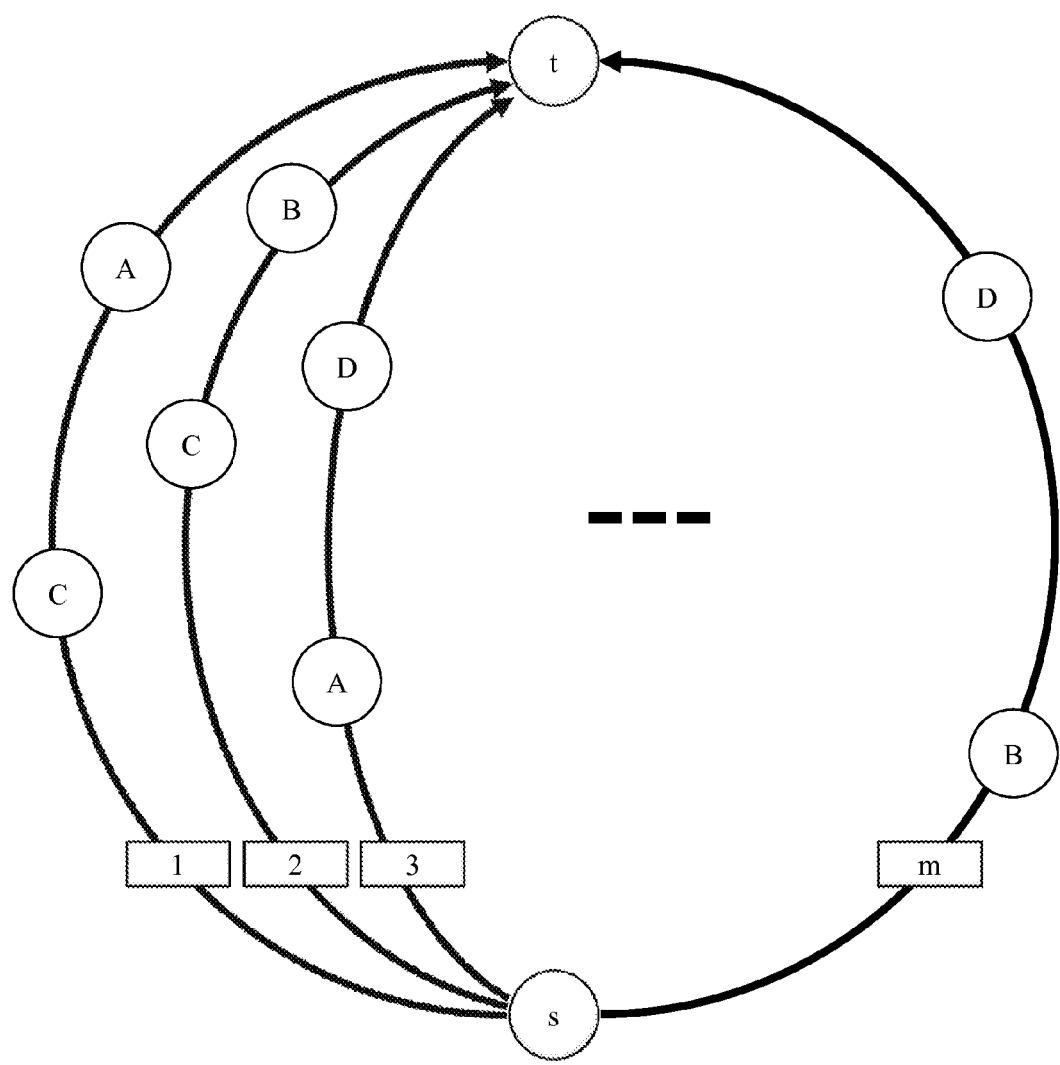
FIG. 12 illustrates an example of how packets will be distributed over multiple paths in a federated coalition network according to at least one embodiment of the invention.

FIG. 12 illustrates how the m packets may be distributed over m paths with four illustrated third parties A, B, C, D.

Figure 13:
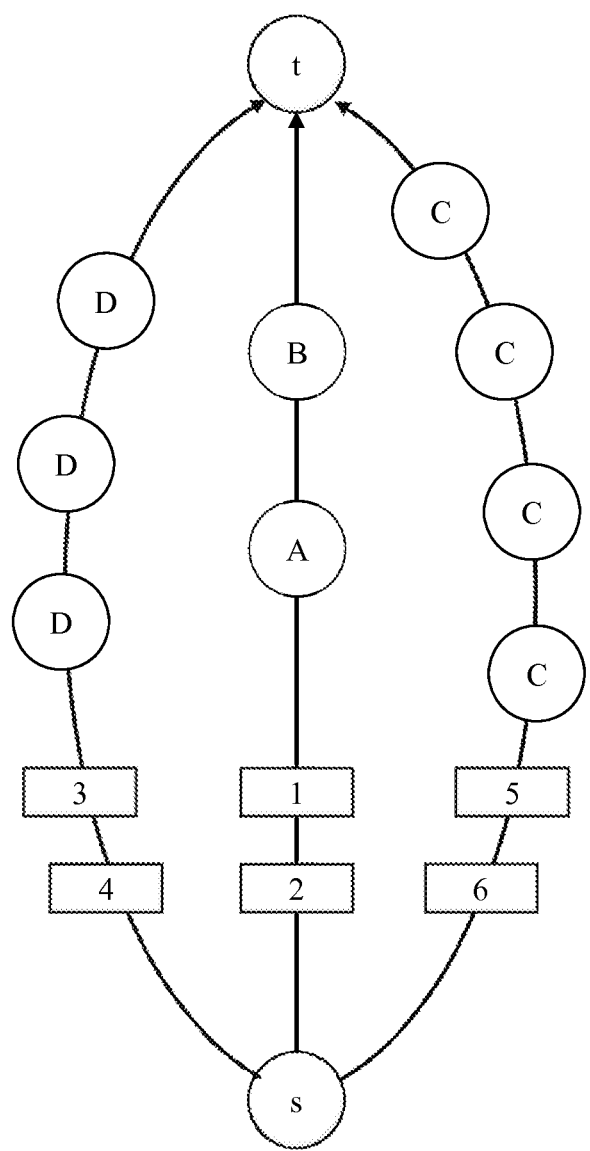
FIG. 13 illustrates another example of how packets will be distributed over multiple paths in a federated coalition network according to at least one embodiment of the invention.

FIG. 13 illustrates an example where n=10 (although only three paths are illustrated), m=6, k=3, and there are four third parties A, B, C, D. The table below will show the counter for each party. The initial counter is set to 2 for each third party when 1 is subtracted from k. The shortest path is the center path where Parties A and B own a node, so their counters are reduced by 2 for the two packets (i.e., packets 1 and 2) that will follow that path. The next shortest path is selected for packets 3 and 4, which will pass through nodes owned by Party D, whose counter will be reduced by 2. The next shortest path is selected for packets 5 and 6, which will pass through nodes owned by Party C, whose counter will be reduced by 2.

|                       | Party A | Party B | Party C | Party D |
|-----------------------|---------|---------|---------|---------|
| Initial counter       | 2       | 2       | 2       | 2       |
| After packets 1 and 2 | 0       | 0       | 2       | 2       |
| After packets 3 and 4 | 0       | 0       | 2       | 0       |
| After packets 5 and 6 | 0       | 0       | 0       | 0       |

If the value of k was 4 or 5, then there could have been 3 or 4 packets sent along the shortest path and the remaining packets sent along the next shortest path while avoiding any of Parties A, B, and D from seeing 4 or 5 different packets, respectively. This modification is an example of how the same number of packets do not need to travel over each of the selected pathways. In a further embodiment, after all of the paths are selected, each path is removed from the set of paths to determine whether there are k packets still being sent over the remaining paths; and when there are not, then adjusting the number of packets over the set of paths while satisfying the counter requirement.

Figure 14:
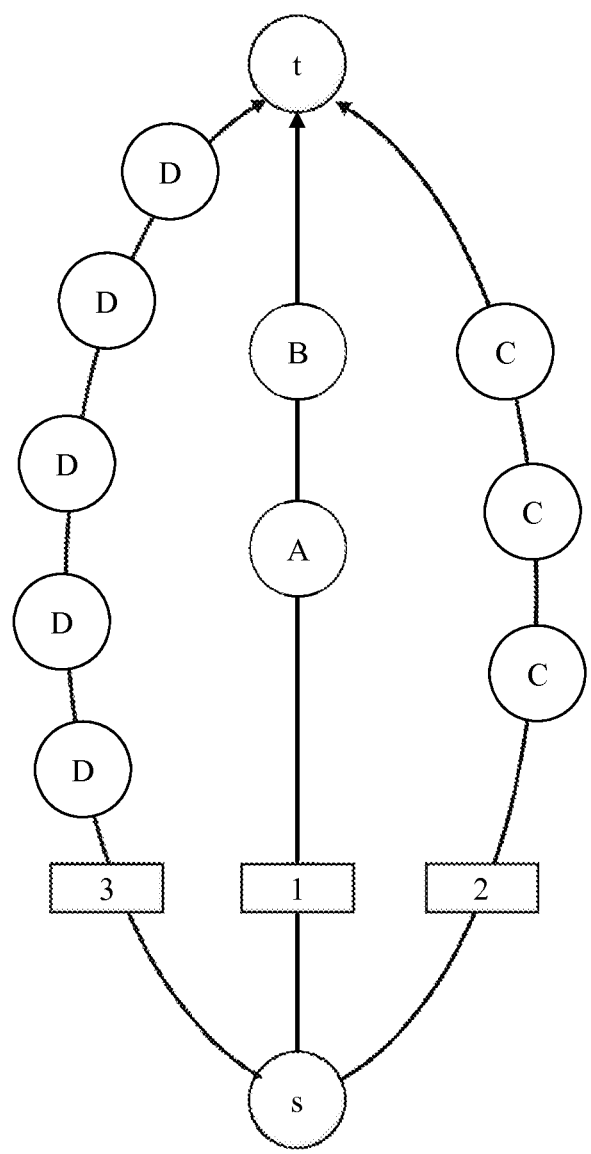
FIG. 14 illustrates another example of how packets will be distributed over multiple paths in a federated coalition network according to at least one embodiment of the invention.

FIG. 14 illustrates an example where n=5 (although only three paths are illustrated), m=3, k=2, and there are four third parties A, B, C, D. The table below will show the counter for each party. The initial counter is set to 1 for each third party when 1 is subtracted from k. The shortest path is the center path where Parties A and B own a node, so there counters are reduced by 1 for the one packet (i.e., packet 1) that will follow that path. The next shortest path is selected for packet 2, which will pass through nodes owned by Party C, whose counter will be reduced by 1. The next shortest path is selected for packet 3, which will pass through nodes owned by Party D, whose counter will be reduced by 1.

|                 | Party A | Party B | Party C | Party D |
|-----------------|---------|---------|---------|---------|
| Initial counter | 1       | 1       | 1       | 1       |
| After packet 1  | 0       | 0       | 1       | 1       |
| After packet 2  | 0       | 0       | 0       | 1       |
| After packet 3  | 0       | 0       | 0       | 0       |

If one of the nodes owned by Party D was owned by Party C instead, then there would not be a path available to send packet 3. In an alternative embodiment, the method would still send packets 1 and 2 because if both packets were received by node t, then node t would be able to reconstruct the information from the two packets, because k number of packets would have been received.

FIGS. 15A and 15B illustrate two example algorithms to work in conjunction with each other to select the path(s) to use for sending the m packets from the recipient node to the requesting node.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment or an embodiment combining software (including firmware, resident software, micro-code, etc.) and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 16:
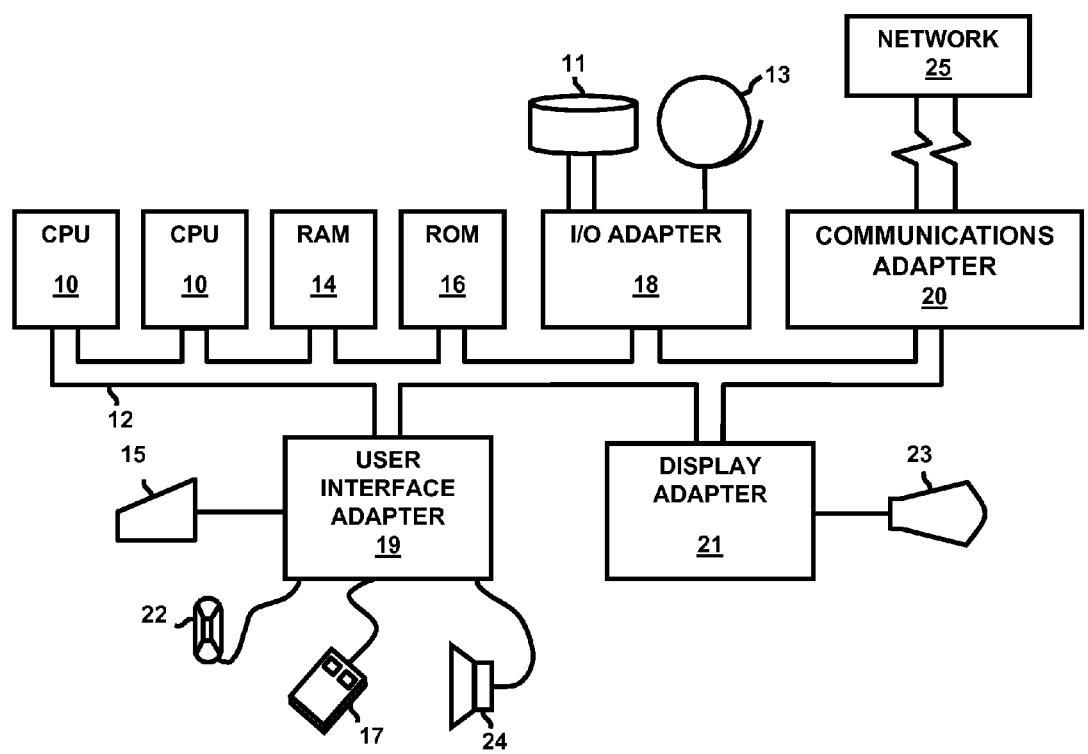
FIG. 16 illustrates a computer program product according to an embodiment of the invention.

Referring now to FIG. 16, a representative hardware environment for practicing at least one embodiment of the invention is illustrated. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

While it is understood that the process software for providing robust privacy preserving data delivery in federated coalition networks may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server and then it will be stored on the proxy server.

Figure 17:
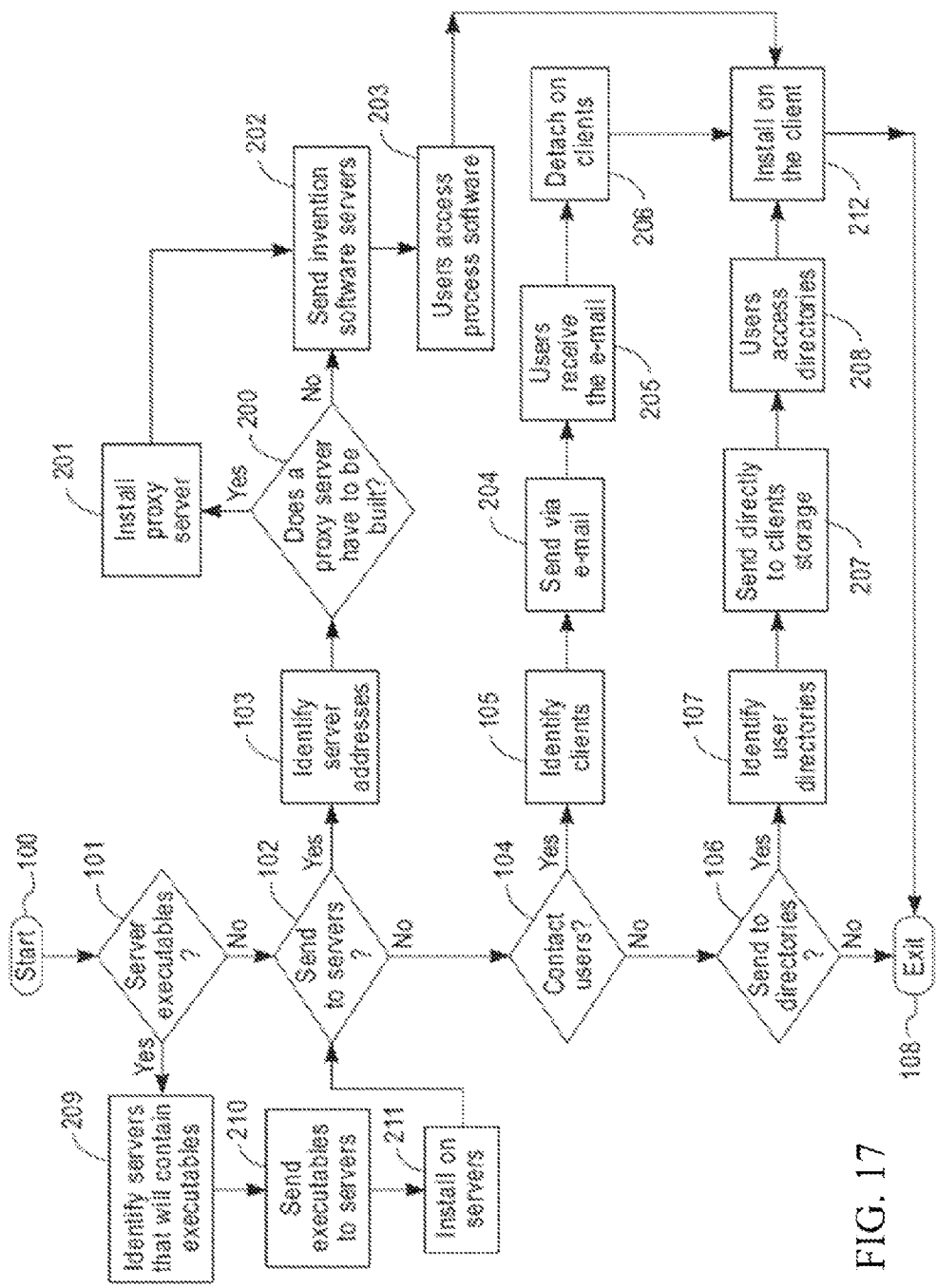
FIG. 17 illustrates an example method for deployment of at least one embodiment according to the invention.

FIG. 17 illustrates a method for the deployment of the process software, 100. The first thing is to determine if there are any programs that will reside on a server or servers when the process software is executed, 101. If this is the case then the servers that will contain the executables are identified, 209. The process software for the server or servers is transferred directly to the servers' storage via FTP or some other protocol or by copying though the use of a shared file system, 210. The process software is then installed on the servers, 211.

Next, a determination is made on whether the process software is be deployed by having users access the process software on a server or servers, 102. If the users are to access the process software on servers then the server addresses that will store the process software are identified, 103.

A determination is made if a proxy server is to be built, 200, to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed, 201. The process software is sent to the servers either via a protocol such as FTP or it is copied directly from the source files to the server files via file sharing, 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems, 203. Another embodiment is to have the servers automatically copy the process software to each client and then run the installation program for the process software at each client computer. The user executes the program that installs the process software on his client computer, 212, then exits the process, 108.

A determination is made whether the process software is to be deployed by sending the process software to users via e-mail, 104. The set of users where the process software will be deployed are identified together with the addresses of the user client computers, 105. The process software is sent via email to each of the users' client computers. The users then receive the e-mail, 205, and then detach the process software from the e-mail to a directory on their client computers, 206. The user executes the program that installs the process software on his client computer, 212, then exits the process, 108.

Lastly a determination is made on whether the process software will be sent directly to user directories on their client computers, 106. If so, the user directories are identified, 107. The process software is transferred directly to the user's client computer directory, 207. This can be done in several ways such as but not limited to sharing of the file system directories and then copying from the sender's file system to the recipient user's file system or alternatively using a transfer protocol such as File Transfer Protocol (FTP).

The users access the directories on their client file systems in preparation for installing the process software, 208. The user executes the program that installs the process software on his client computer, 212, then exits the process, 108.

The process software with a method for providing robust privacy preserving data delivery in federated coalition networks is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 18:
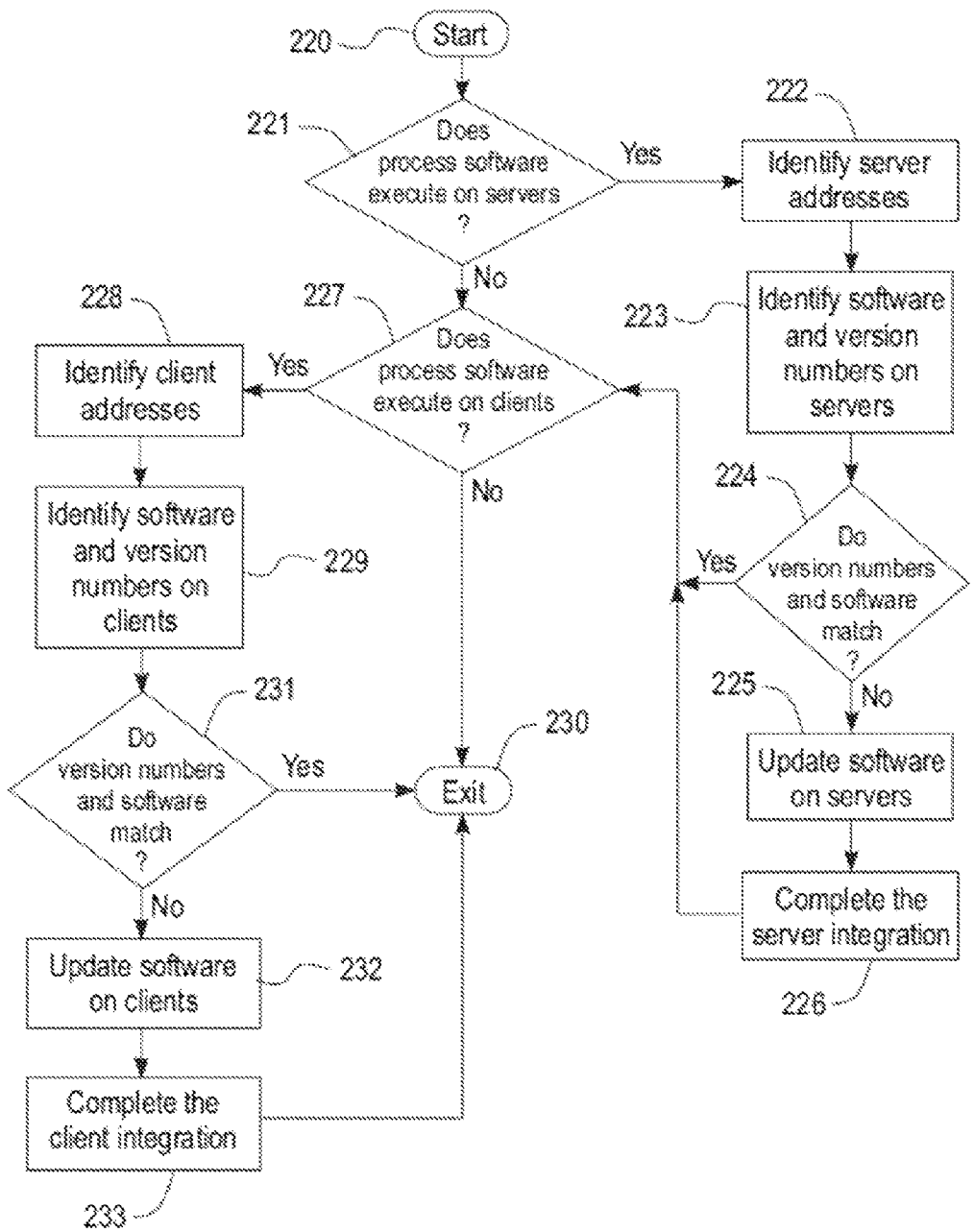
FIG. 18 illustrates an example method for integration of at least one embodiment according to the invention.

FIG. 18 illustrates a method for the integration of the process software, 220. The first thing is to determine if there are any process software programs that will execute on a server or servers, 221. If this is not the case, then integration proceeds to 227. If this is the case, then the server addresses are identified, 222. The servers are checked to see if they contain software that includes the operating system (OS), applications, and network operating systems (NOS), together with their version numbers that have been tested with the process software, 223. The servers are also checked to determine if there is any missing software that is required by the process software, 223.

A determination is made if the version numbers match the version numbers of OS, applications and NOS that have been tested with the process software, 224. If all of the versions match and there is no missing required software the integration continues in 227.

If one or more of the version numbers do not match, then the unmatched versions are updated on the server or servers with the correct versions, 225. Additionally if there is missing required software, then it is updated on the server or servers, 225. The server integration is completed by installing the process software, 226.

Determining if there are any programs of the process software that will execute on the clients, 227, which follows 221, 224 or 226. If no process software programs execute on the clients the integration proceeds to 230 and exits. If this not the case, then the client addresses are identified, 228.

The clients are checked to see if they contain software that includes the operating system (OS), applications, and network operating systems (NOS), together with their version numbers that have been tested with the process software, 229. The clients are also checked to determine if there is any missing software that is required by the process software, 229.

A determination is made is the version numbers match the version numbers of OS, applications and NOS that have been tested with the process software, 231. If all of the versions match and there is no missing required software, then the integration proceeds to 230 and exits.

If one or more of the version numbers do not match, then the unmatched versions are updated on the clients with the correct versions, 232. In addition, if there is missing required software then it is updated on the clients, 232. The client integration is completed by installing the process software on the clients, 233. The integration proceeds to 230 and exits.

The process software for providing robust privacy preserving data delivery in federated coalition networks is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 19:
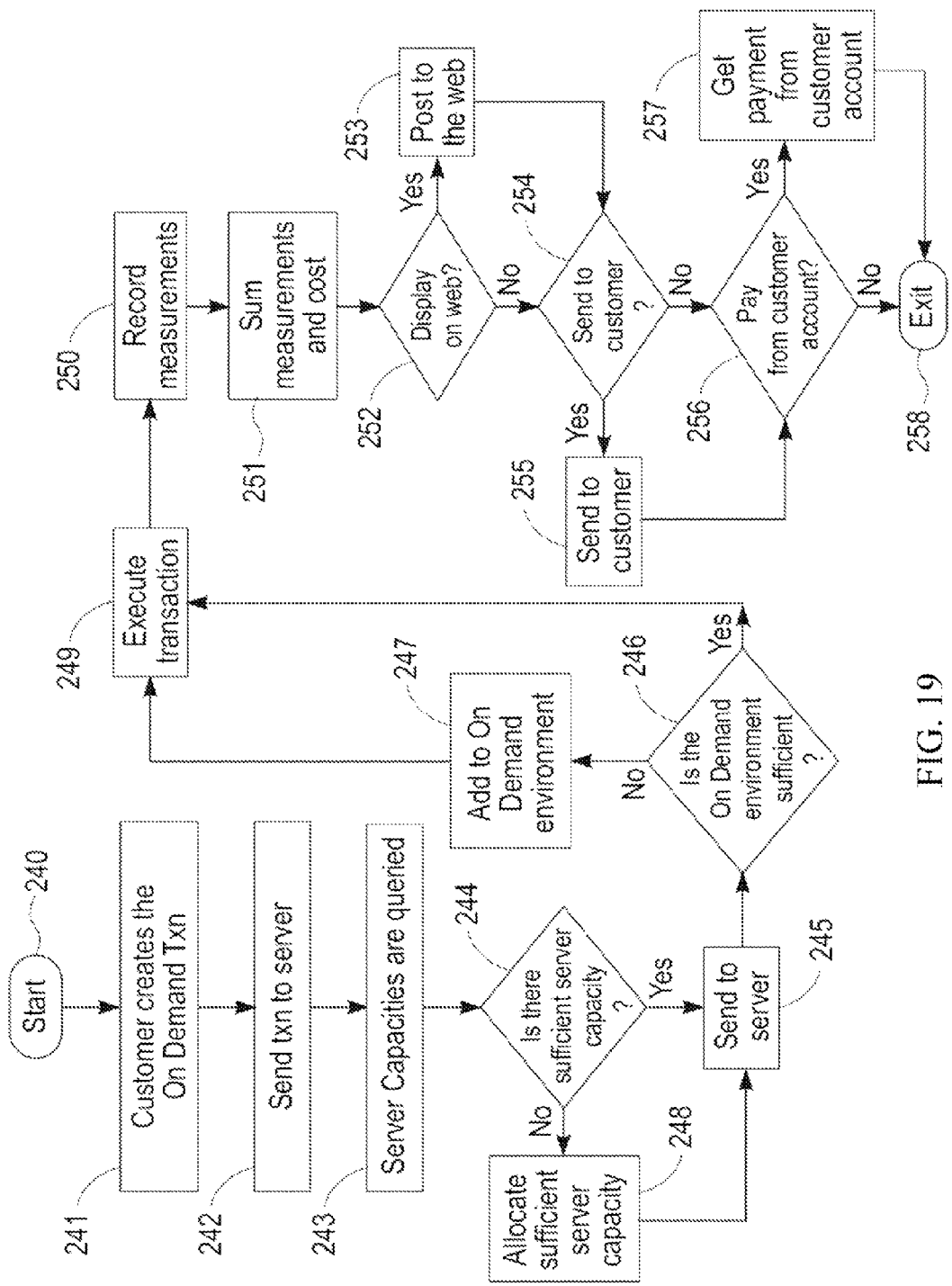
FIG. 19 illustrates an example method for On Demand availability of at least one embodiment according to the invention.

FIG. 19 illustrates a method for the On Demand process, 240. A transaction is created than contains the unique customer identification, the requested service type and any service parameters that further specify the type of service, 241. The transaction is then sent to the main server, 242. In an On Demand environment the main server can initially be the only server, and then as capacity is consumed other servers are added to the On Demand environment.

The server central processing unit (CPU) capacities in the On Demand environment are queried, 243. The CPU requirement of the transaction is estimated, then the server's available CPU capacity in the On Demand environment is compared to the transaction CPU requirement to see if there is sufficient CPU available capacity in any server to process the transaction, 244. If there is not sufficient server CPU available capacity, then additional server CPU capacity is allocated to process the transaction, 248. If there was already sufficient Available CPU capacity then the transaction is sent to a selected server, 245.

Before executing the transaction, a check is made of the remaining On Demand environment to determine if the environment has sufficient available capacity for processing the transaction. This environment capacity consists of such things as but not limited to network bandwidth, processor memory, storage etc., 246. If there is not sufficient available capacity, then capacity will be added to the On Demand environment, 247. Next the required software to process the transaction is accessed, loaded into memory, and then the transaction is executed, 249.

The usage measurements are recorded, 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer, 251.

If the customer has requested that the On Demand costs be posted to a web site, 252, then they are posted, 253. If the customer has requested that the On Demand costs be sent via e-mail to a customer address, 254, then they are sent, 255. If the customer has requested that the On Demand costs be paid directly from a customer account, 256, then payment is received directly from the customer account, 257. The last step is exit the On Demand process.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method comprising:
receiving at least one information request packet at a node from at least one neighboring node in a federated computer network,
conducting a search of information at the node by the node to determine if requested information is present,
when the requested information is present, then the node
sends an acknowledgement to a requesting node using header information present in the information request packet to route the acknowledgement back to the requesting node,
linear network codes the requested information into m packets where m is greater than or equal to k, which is the number of packets needed to be received by the requesting node to reconstruct the requested information,
selects multiple paths between the node and the requesting node such that no third party to the node and the requesting node will have more than k−1 different packets pass through any one or more node controlled by that third party, and
transmits the m packets distributed over the selected paths, and
storing a path of any received information request packet in a memory of the node.

2. The method according to claim 1, further comprising when the requested information is not present, then
updating a header information of the information request packet to include identification of the node including identity of a party owning the node, and
forwarding the information request to at least one other node other than the neighboring node that sent the information request packet.

3. The method according to claim 1, further comprising:
checking a header of each received information request packet for a path to determine whether the node is present in the path,
when the node is present in the path, disregarding the information request packet.

4. The method according to claim 1, further comprising:
checking a header of each received information request packet for a path to determine whether a second neighboring node other than the neighboring node that sent the information request packet is present in the path,
when the second neighboring node is present in the path, disregarding the information request packet.

5. The method according to claim 1, further comprising:
receiving by the node a stop packet for the information request packet,
stopping by the node the sending of the information request packet, and
forwarding by the node the stop packet to a neighboring node other than the neighboring node that sent the stop request.

6. The method according to claim 1, further comprising
counting by the node the number of paths for the information request packets received by the node,
when the number equals n, the node stopping the sending of the information request packet to neighboring nodes if the information request packet is received again.

7. The method according to claim 1, further comprising when n paths are collected by the node that has sent the acknowledgement, sending a ready notification to the requesting node.

8. The method according to claim 1, wherein selecting multiple paths includes
setting a counter for each other third party present in the federated coalition network equal to k−1,
selecting a first path between the node and the requesting node based at least in part on stored paths for the information request packet,
reducing the counter for each third party present along the first path by a number of packets to be sent over the first path,
selecting at least one second path between the node and the requesting node based at least in part on stored paths for the information request packet, and
reducing the counter for each third party present along the at least one second path by a number of packets to be sent over the at least one second path.

9. The method according to claim 8, wherein the first path and the at least one second path are selected based on at least a length of the paths such that a shortest path is selected for the first path and a next shortest path is selected for the second path.

10. The method according to claim 8, further comprising sending a notification from the node to the requesting node regarding being unable to send requested information if insufficient paths exist to send m packets containing the requested information.

11. The method according to claim 1, wherein selecting n paths includes
retrieving paths for the federated coalition network between the node and the requesting node where the paths are based on topology for the federated coalition network derived from link state flooding messages,
setting a counter for each other third party present in the federated coalition network equal to k−1,
selecting a first path between the node and the requesting node based at least in part on retrieved paths,
reducing the counter for each third party present along the first path by a number of packets to be sent over the first path,
selecting at least one second path between the node and the requesting node based at least in part on retrieved paths, and
reducing the counter for each third party present along the at least one second path by a number of packets to be sent over the at least one second path.

12. The method according to claim 11, wherein the first path and the at least one second path are selected based on at least a length of the paths such that a shortest path is selected for the first path and a next shortest path is selected for the second path.

13. The method according to claim 1, wherein selecting multiple paths includes setting by a central processor a counter for each other third party present in the federated coalition network equal to k−1,
selecting by the central processor a first path between the node and the requesting node based at least in part on stored paths for the information request packet at the node,
reducing by the central processor the counter for each third party present along the first path by a number of packets to be sent over the first path,
selecting by the central processor at least one second path between the node and the requesting node based at least in part on stored paths for the information request packet at the node, and
reducing by the central processor the counter for each third party present along the at least one second path by a number of packets to be sent over the at least one second path.

14. A method comprising:
sending an information request packet from a requesting node into a federated coalition network having a plurality of nodes owned by at least two other parties,
receiving the information request packet by at least one neighboring node of the requesting node,
updating a header information of the information request packet to include identification of the node that received the information request including identity of a party owning the recipient node,
sending the information request packet from the node that received the information request packet to nodes in communication with it other than the requesting node,
receiving at least one information request packet at a recipient node from at least one neighboring node,
conducting a search of information at the recipient node by the recipient node to determine if the requested information is present,
when the requested information is present, then the recipient node
    sends an acknowledgement to a requesting node using header information present in the information request packet to route the acknowledgement back to the requesting node,
    linear network codes the requested information into m packets where m is greater than or equal to k, which is the number of packets needed to be received by the requesting node to reconstruct the requested information,
    selects paths between the recipient node and the requesting node such that no third party to the recipient node and the requesting node will have more than k−1 different packets pass through any one or more node controlled by that third party, and
    transmits the m packets distributed over the selected paths, and
storing a path of any received information request packet in a memory of the node.

15. The method according to claim 14, further comprising:
collecting any acknowledgement sent in response to the information request packet for a period of time equal to twice a network traversal time for the federated coalition network by the requesting node,
sending a stop packet by the requesting node to any node neighboring the requesting node after receiving a ready packet from any node that sent the acknowledgement,
receiving a stop packet for the information request packet by the at least one neighboring node,
stopping the sending of the information request packet by the neighboring node in response to receiving the stop packet, and
forwarding the stop packet to each neighboring node other than the neighboring node that sent the stop request.

16. The method according to claim 14, further comprising:
checking a header of each received information request packet for a path to determine whether the recipient node or the neighboring node of the requesting node is present in the path or a second neighboring node other than the neighboring node that sent the information request packet is present in the path, and
when the determination is positive, disregarding the information request packet.

17. The method according to claim 14, further comprising wherein selecting paths includes
    setting a counter for each other third party present in the federated coalition network equal to k−1,
    selecting a first path between the recipient node and the requesting node based at least in part on stored paths for the information request packet,
    reducing the counter for each third party present along the first path by a number of packets to be sent over the first path,
    selecting at least one second path between the recipient node and the requesting node based at least in part on stored paths for the information request packet, and
    reducing the counter for each third party present along the at least one second path by a number of packets to be sent over the at least one second path.

18. The method according to claim 17, wherein the first path and the at least one second path are selected based on at least a length of the paths such that a shortest path is selected for the first path and a next shortest path is selected for the second path.

19. A method comprising:
sending a request for information from a requesting node into a federated coalition network having a plurality of nodes owned by at least two other parties,
collecting any acknowledgement sent in response to the information request for a period of time equal to twice a network traversal time for the federated coalition network by the requesting node,
sending a stop packet by the requesting node to any node neighboring the requesting node after receiving a ready packet from any node that sent the acknowledgement,
receiving at least k linear network coded packets by any node that sent an acknowledgement to the requesting node such that no other party in the federated coalition network received more than k−1 different packets,
reconstructing the information from the at least k linear coded packets, and
storing a path of any received information request packet in a memory of the node.

* * * * *